(12) United States Patent
Metzner et al.

(10) Patent No.: US 10,545,903 B2
(45) Date of Patent: Jan. 28, 2020

(54) BUS DRIVER CIRCUIT

(71) Applicant: Infineon Technologies AG, Neubiberg (DE)

(72) Inventors: Dieter Metzner, Eichenau (DE); Magnus-Maria Hell, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/287,496

(22) Filed: Feb. 27, 2019

(65) Prior Publication Data
US 2019/0272248 A1 Sep. 5, 2019

(30) Foreign Application Priority Data
Mar. 1, 2018 (DE) .................. 10 2018 104 732

(51) Int. Cl.
*H04L 25/12* (2006.01)
*G06F 13/40* (2006.01)
*H04B 3/06* (2006.01)

(52) U.S. Cl.
CPC ...... *G06F 13/4072* (2013.01); *G06F 13/4022* (2013.01); *H04B 3/06* (2013.01); *H04L 25/12* (2013.01)

(58) Field of Classification Search
CPC . H04L 2012/40215; H04L 2012/40221; H04L 2012/40228; H04L 2012/40234; H04L 2012/40241; H04L 2012/40247; H04L 25/0272; G06F 13/4072; G06F 13/4022
See application file for complete search history.

(56) References Cited

U.S. PATENT DOCUMENTS

2008/0307133 A1* 12/2008 Priel ............... H04J 3/0685
710/106
2016/0149578 A1* 5/2016 Lee .................. H03K 19/01852
327/108
2018/0121385 A1* 5/2018 Segarra ............... G06F 13/4286

FOREIGN PATENT DOCUMENTS

JP 2005236915 A 9/2005

* cited by examiner

*Primary Examiner* — Kevin Kim
(74) *Attorney, Agent, or Firm* — Slater Matsil, LLP

(57) ABSTRACT

In accordance with an embodiment, a method includes receiving a transmission signal; converting the received transmission signal into a corresponding bus signal by driving an output stage of a transmitter having a plurality of switches, where a switching behavior of the plurality of switches of the output stage is dependent on a parameter set; converting the bus signal into a corresponding reception signal, wherein an edge of the reception signal is delayed by a loop delay relative to a corresponding edge in the transmission signal; determining a measurement value for the loop delay; and altering the parameter set in order to adapt the loop delay.

17 Claims, 7 Drawing Sheets

BUS DRIVER CIRCUIT

This application claims the benefit of German Application No. 102018104732.0, filed on Mar. 1, 2018, which application is hereby incorporated herein by reference in its entirety.

TECHNICAL FIELD

The present description relates to the field of data buses, in particular bus nodes and bus driver circuits.

BACKGROUND

Data buses are used for digital communication between two or more electronic devices. A device connected to a bus is often referred to as bus node. In general, the expression "bus" usually denotes a communication system comprising both the specification of the bus hardware and a communication protocol according to which the bus nodes communicate. Many data buses are standardized, with different bus standards prevailing in different areas of industry. By way of example, CAN (Controller Area Network), LIN (Local Interchange Network) and FlexRay are often used in the automotive industry. USB (Universal Serial Bus) is widely used in the field of consumer electronics.

A bus node (i.e. an electronic device connected to the bus) usually comprises a bus interface (e.g. an electronic circuit) that realizes the actual transmission of data to the bus and the reception of data from the bus according to the respective bus standard. A bus interface can comprise a bus driver circuit used for implementing the data transmission at the physical level (e.g. layer 1 of the known OSI model). In this case, the bus driver has to provide defined states at the physical connections to the bus line (or the bus lines). By way of example, the bus driver generates a defined first voltage level (e.g. 0 volts) in order to transmit a binary "0" via the bus, and a defined second voltage level (e.g. 12 volts) in order to transmit a binary "1" via the bus.

In many standardized buses, the bus driver can assume at least one "high-impedance" state in order to avoid problems if different bus nodes generate contradictory voltage levels on the bus lines. Tri-state bus drivers are sometimes used. However, many standardized buses use only two states (in order to represent a binary "0" and a "1"), wherein in one state (e.g. the binary "1") the voltage level (e.g. 12 volts) is applied to the bus line (or the bus lines) via a resistor. This state is referred to as "recessive" or "idle". A second state (e.g. the binary "0") is called "dominant" or "active" because in this state the voltage level (e.g. 0 volts) is applied to the bus line via a low-impedance current path, for example by means of a closed semiconductor switch. In a case in which a bus node generates a "dominant" ("active") state by a voltage level of 0 volts being constrained on the bus line, all other bus nodes which simultaneously generate a "recessive" ("idle") state are overridden. Their output is protected by the resistor mentioned. Only the terms "recessive" and "dominant" will now be used hereinafter to describe the states at the output of a bus driver.

In all bus systems, the bus nodes (i.e. the bus driver circuits thereof) have to be able to generate a recessive state and a dominant state in order to enable collision-free communication. By way of example, in LIN or CAN systems, the recessive state represents a binary "1", wherein the dominant state represents a binary "0". In FlexRay or USB systems, the recessive state is usually referred to as "idle" and represents a period without communication. Although this recessive idle state is not assigned to a data bit (in FlexRay and USB systems, both "1" and "0" are dominant states), the transitions from a dominant to the recessive state are specified in the respective bus standard. For example, the transitions have to meet the timing requirements specified in the standard.

Bus driver circuits usually comprise one or more semiconductor switches configured to connect and disconnect the bus line (or bus lines) to and from a supply potential or ground potential (either via a resistor or with low impedance). However, the bus line (bus lines) can also have a significant resistance and, in particular, a capacitance, which has an influence on the switching time between a dominant and a recessive state. Consequently, the switching time is dependent not only on the characteristics of the driver circuit, but also on the properties of the connected bus line. Slow transitions to a recessive state can be problematic if high data rates are desired. Furthermore, reflections can occur at the individual bus nodes, said reflections interfering with the output signal at another bus node. Undesired oscillations can also occur during a transition from a dominant to a recessive state.

SUMMARY

A method is described which, in accordance with one exemplary embodiment, comprises the following: receiving a transmission signal and converting the transmission signal into a corresponding bus signal by driving an output stage of a transmitter having a plurality of switches. In this case, driving the output stage is carried out depending on a parameter set that influences the switching behavior of the switches of the output stage. The method further comprises: converting the bus signal into a corresponding reception signal, wherein an edge in the reception signal is delayed by a loop delay relative to a corresponding edge in the transmission signal, determining a measurement value for the loop delay; and altering the parameter set in order to adapt the loop delay.

Furthermore, a bus driver is described. In accordance with one exemplary embodiment, the bus driver comprises the following: at least one first circuit node for connecting to at least one bus line and a transmitter having an output stage having a plurality of switches. The transmitter is configured to receive a transmission signal, to convert the latter into a corresponding bus signal by driving the output stage, and to output the bus signal at the at least one first circuit node. Driving the output stage is carried out depending on a parameter set that influences the switching behavior of the switches of the output stage. The bus driver furthermore comprises a receiver configured to convert the bus signal into a reception signal, wherein an edge in the reception signal is delayed by a loop delay relative to a corresponding edge in the transmission signal. A control circuit is coupled to the transmitter and the receiver, said control circuit being configured to determine a measurement value for the loop delay and to alter the parameter set in order to adapt the loop delay.

BRIEF DESCRIPTION OF THE DRAWINGS

Exemplary embodiments are explained in greater detail below with reference to figures. The illustrations are not necessarily true to scale and the exemplary embodiments are not restricted only to the aspects illustrated. Rather, importance is attached to presenting the principles underlying the exemplary embodiments. In the Figures.

DETAILED DESCRIPTION OF ILLUSTRATIVE EMBODIMENTS

Figure 1A:
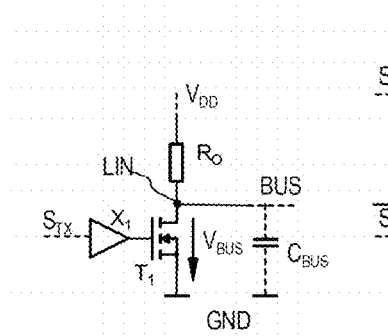
FIGS. 1a-1c show simplified examples of bus driver circuits for a LIN bus system (FIG. 1a), for a CAN bus system (FIG. 1b) and for a FlexRay bus system (FIG. 1c)
Figure 1B:
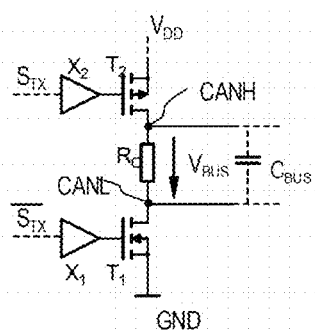
Figure 1C:
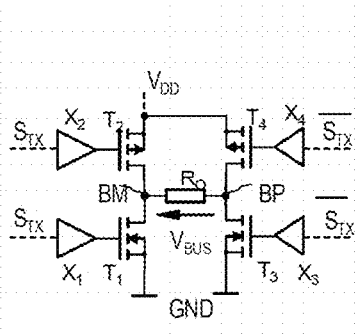

FIGS. 1a-1c show various examples of bus driver circuits which are coupled to the associated bus lines. FIG. 1a shows a LIN bus driver, FIG. 1b shows a CAN bus driver, and FIG. 1c shows a FlexRay bus driver. The LIN bus driver in accordance with FIG. 1a substantially comprises a transistor $T_1$ and a resistor $R_0$ (output resistor). The load current path (e.g. the drain-source path in the case of a MOSFET) of the transistor $T_1$ and the resistor $R_0$ are connected in series. The load current path of the transistor $T_1$ is connected between a circuit node GND, which is at a reference potential (e.g. ground potential), and an output node LIN connected to the bus line. The resistor $R_0$ operates as a pull-up resistor and is connected between the output node LIN and a supply node SUP, at which a supply voltage $V_{DD}$ is present. A diode (not illustrated) or some other circuit can be connected in series with the resistor $R_0$ between the output node LIN and the supply node SUP. The bus line can have a (parasitic) capacity, which is represented by the capacitor $C_{BUS}$ illustrated in FIG. 1a. The control electrode (e.g. the gate electrode in the case of a MOSFET) is driven with the aid of a gate driver circuit $X_1$ configured to convert a binary (on/off) control signal into a corresponding gate signal suitable for driving the transistor, in order to switch the transistor on and off.

As illustrated in FIG. 1a, the voltage level $V_{BUS}$ present on the bus line (relative to the reference potential) is either approximately 0 volts (i.e. the reference potential if the voltage drop across the transistor $T_1$ with the transistor being switched on is disregarded) or equal to the supply voltage $V_{DD}$ (e.g. 12 volts). While the transistor $T_1$ is switched on, it actively pulls the bus voltage $V_{BUS}$ to ground potential (0 volts) by providing a low-impedance current path between the output node LIN and the reference potential (ground potential GND). Consequently, a bus voltage $V_{BUS}$ of approximately 0 volts is a dominant state, which is assigned to a "0" bit. The present LIN standard demands a bus voltage level of less than 20% of the supply voltage to signal a "0" bit, and a bus voltage of higher than 80% of the supply voltage VDD to signal a "1" bit. While the transistor $T_1$ is switched off, the bus voltage $V_{BUS}$ is pulled to the supply voltage $V_{DD}$ by the resistor $R_0$. This state in which the bus driver (strictly speaking the output stage of the bus driver) has a high output impedance is a recessive state. The output voltage level of the bus driver can be overridden by other bus nodes.

Figure 2A:
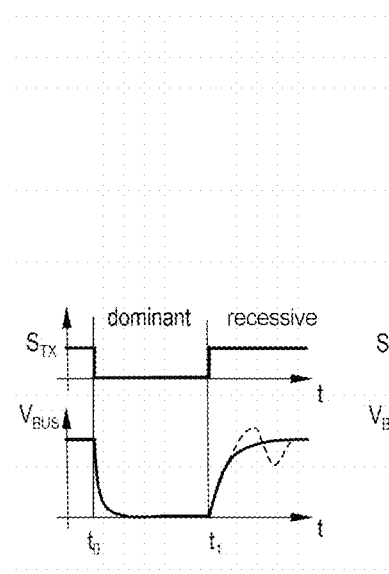
FIGS. 2a-2c show the respective signal profiles of transmission signal and corresponding bus voltage for the examples illustrated in FIG. 1.

FIG. 2a comprises timing diagrams for the binary control signal $S_{TX}$ and the resulting bus voltage $V_{BUS}$ for the example from FIG. 1a. In the example illustrated, at the point in time $t_0$ the control signal changes from a high level (binary "1") to a low level (binary "0"). The gate driver generates a gate signal in order to switch on the transistor $T_1$, and the bus voltage $V_{BUS}$ thus falls rapidly to approximately 0 volts (the reference potential). The fall time of the bus voltage is substantially determined by the switching time of the transistor $T_1$. At the point in time $t_1$ the control signal $S_{TX}$ reverts to the high level, and the gate driver $X_1$ generates a gate signal that switches off the transistor $T_1$. Consequently, the bus voltage $V_{BUS}$ rises to approximately $V_{DD}$ (the supply voltage). The rise time is principally determined by the resistance of the resistor $R_0$ and the capacitance $C_{BUS}$ which has to be charged via the resistor $R_0$. Since the bus line can also have a parasitic inductance, it is possible—depending on the actual implementation—for the bus capacitance $C_{BUS}$ to contribute to a (parasitic) resonance circuit, and transient oscillations (ringing) can occur (see dashed line in FIG. 2a). The transition time from the dominant (low level) to the recessive (high level) state is principally determined by external parameters and independently of the switching time of the transistor $T_1$.

FIG. 1b shows one of the CAN bus drivers. This bus driver operates in a manner similar to the LIN bus driver from FIG. 1a, but the bus voltage is represented by a differential signal in CAN systems. Accordingly, two bus lines are used, which are connected to the output nodes CANH and CANL of the CAN bus driver. A ground line is not necessarily required for the data transmission. The bus driver circuit substantially comprises two transistors $T_1$ and $T_2$, and a resistor $R_0$ (output resistor). The resistor $R_0$ is connected between the output nodes CANL and CANH. The load current path of the transistor $T_1$ is connected between the ground node GND (reference potential) and the output node CANL, whereas the load current path of the transistor $T_2$ is connected between the output node CANH and the supply node SUP, at which the supply voltage $V_{DD}$ is present. A diode (not illustrated) or other circuits can be connected in series with the resistor between the output node CANH and the supply node SUP. The bus line has a (parasitic) capacitance represented by the capacitor $C_{BUS}$ in FIG. 1b.

The control electrodes (e.g. gate electrodes in the case of MOSFETs) are driven with the aid of the gate control circuits $X_1$ and $X_2$. The latter are configured to convert a binary control signal into gate signals suitable for driving the transistors $T_1$ and $T_2$, in order to switch the transistors $T_1$ and respectively $T_2$ on and off. Alternatively, depending on the respective implementation, a common gate driver circuit can be used for both transistors $T_1$ and $T_2$. The (differential) voltage $V_{BUS}$ present between the bus lines is either approximately 0 volts, if both transistors $T_1$ and $T_2$ are switched off, or equal to the supply voltage $V_{DD}$ (e.g. 5 volts or 12 volts), if both transistors $T_1$ and $T_2$ are switched on. Both transistors $T_1$, $T_2$ can switch substantially synchronously.

If the transistor $T_1$ is switched on, it actively pulls the potential of the output node CANH to the supply potential $V_{DD}$ by virtue of a low-impedance current path being provided between the output node CANH and the node at which the supply voltage $V_{DD}$ is present. Furthermore, the transistor $T_2$, if it is switched on, actively pulls the potential of the output node CANL to the reference potential (0 volts) by virtue of a low-impedance current path being provided between the output node CANL and the ground node GND. As a result, the bus voltage $V_{BUS}$ is—theoretically—approximately equal to the supply voltage $V_{DD}$. In practice, on account of voltage drops at polarity reversal protective diodes (not illustrated) and the transistors of the H-bridge, the bus voltage $V_{BUS}$ is often lower than the supply voltage $V_{DD}$ and is approximately between two and five volts. This state is a dominant state and represents a binary (logic) "0". If the transistors $T_1$ and $T_2$ are switched off, the output nodes CANL and CANH are isolated from the ground node GND and the supply node, and the capacitance $C_{BUS}$ discharges across the resistor $R_0$. In the settled state, the capacitance $C_{BUS}$ is discharged, which results in a bus voltage $V_{BUS}$ of substantially 0 volts. This state is a recessive state and represents a binary (logic) "1".

Figure 2B:
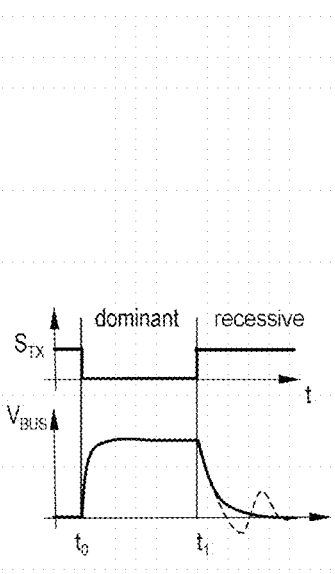

FIG. 2b includes timing diagrams for the binary control signal $S_{TX}$ and the resulting bus voltage $V_{BUS}$ for a CAN bus. At the point in time $t_0$ the control signal changes from a high level (binary "1") to a low level (binary "0"). The gate driver generates gate signals in order to switch on the transistors $T_1$ and $T_2$, and the bus voltage $V_{BUS}$ thus rises comparatively rapidly to (theoretically) the supply voltage $V_{DD}$. The rise time of the bus voltage $V_{BUS}$ is substantially determined by the switching speed of the transistors $T_1$ and $T_2$. At the point in time $t_1$ the control signal $S_{TX}$ changes back to the high level and the gate driver generates gate signals in order to switch off the transistors $T_1$ and $T_2$. The bus voltage $V_{BUS}$ thus falls to approximately 0 volts (i.e. the reference/ground potential). The fall time is substantially determined by the resistance of the resistor $R_0$ and the capacitance $C_{BUS}$ which has to be discharged via the resistor $R_0$. Depending on the actual implementation, the bus capacitance can contribute to a (parasitic) resonance circuit (e.g. together with line inductances), and transient oscillations (ringing) can occur (see dashed line in FIG. 2b). The transition time from the dominant (low level of the control signal $S_{TX}$) to the recessive (high level of the control signal $S_{TX}$) state is thus substantially determined by external parameters and is not dependent only on the switching times of the transistors $T_0$ and $T_1$.

FIG. 1c illustrates a FlexRay bus driver, which operates in a manner similar to the CAN bus driver from FIG. 1b. The bus voltage $V_{BUS}$ is a differential signal in FlexRay systems, too. In contrast to the CAN bus driver from FIG. 1b, the FlexRay bus driver is implemented as transistor H-bridge formed by the four transistors $T_1$, $T_2$, $T_3$ and $T_4$. The transistors $T_1$ and $T_2$ form a first transistor half-bridge, wherein the common circuit node of the transistors $T_1$ and $T_2$ is referred to as output node BM. The transistors $T_3$ and $T_4$ form a second transistor half-bridge, wherein the common circuit node of the transistors $T_3$ and $T_4$ is referred to as output node BP. Both half-bridges are connected between the supply node, which is supplied with a supply voltage $V_{DD}$, and a ground node GND. The transistors $T_2$ and $T_4$ are high-side switches and the transistors $T_1$ and $T_3$ are low-side switches, and the two output nodes BP and BM are connected via an output resistor $R_0$. The bus driver is in a recessive (idle) state if all the transistors $T_1$ to $T_4$ are switched off. In a first dominant (active) state, the low-side transistor $T_1$ and the high-side transistor $T_4$ are switched on, while the other two transistors are switched off, such that as a result the bus voltage $V_{BUS}$ is positive and (theoretically) equal to the supply voltage $+V_{DD}$. In a second dominant (active) state, the low-side transistor $T_3$ and the high-side transistor $T_2$ are switched on, while the other two transistors are switched off, such that as a result the bus voltage $V_{BUS}$ is negative and (theoretically) equal to the inverse supply voltage $-V_{DD}$. The first dominant state represents a binary "1", whereas the second dominant state represents a binary "0". In practice, on account of voltage drops at polarity reversal protective diodes (not illustrated) and the transistors of the H-bridge, the absolute value of the bus voltage $V_{BUS}$ is lower than the supply voltage $V_{DD}$; given a supply voltage of 5 V, the bus voltage $V_{BUS}$ in the dominant states can be approximately ±1.2 V.

Figure 2C:
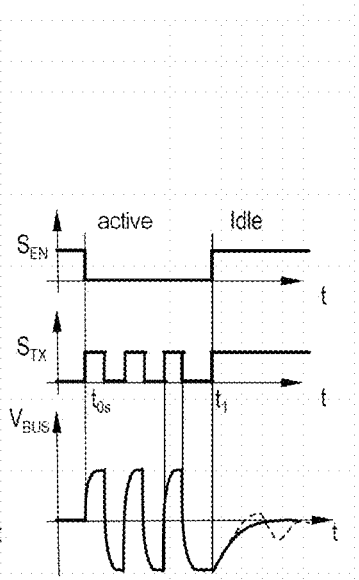

Two bus lines are connected to the output nodes BP and BM. Said bus lines have a (parasitic) capacitance represented by the capacitor $C_{BUS}$ (in a manner similar to that in FIG. 1b, but not illustrated in FIG. 1c). In the present example, four gate driver circuits $X_1$ to $X_4$ are assigned to the four transistors $T_1$ to $T_4$, wherein each gate driver circuit receives the control signal $S_{TX}$ (or an inverted version thereof). The inputs of the gate driver circuits $X_1$ to $X_4$ can be gated, e.g. by the use of an enable signal $S_{EN}$ as in FIG. 2c. FIGS. 2a-2c illustrate timing diagrams of the control signal $S_{TX}$ and of the enable signal $S_{EN}$ in FIG. 2c. While the enable signal $S_{EN}$ is at a high level, all the transistors $T_1$ to $T_4$ are switched off, and the bus voltage across the output resistor $R_0$ is approximately zero volts. The bus driver is thus in a recessive (idle) state. If the enable signal $S_{EN}$ changes to a low level, then the bus driver changes to a dominant (active) state. Depending on the value of the control signal $S_{TX}$, either the transistors $T_2$ and $T_3$ are switched on (while $T_1$ and $T_4$ are off) or the transistors $T_1$ and $T_4$ are switched on (while $T_2$ and $T_3$ are off).

In the event of a change from one dominant state to the other dominant state (e.g. if $S_{TX}$ changes from "0" to "1" (or vice versa) while $S_{EN}$ is "0"), the transition time is substantially dependent on the switching time of the transistors of the H-bridge. However, in the event of a change from a dominant state to the recessive state (see point in time $t_1$ in FIG. 2c), the bus capacitance $C_{BUS}$ is discharged via the output resistor $R_0$. The transition is comparatively slow and is dependent on external parameters and not only on parameters (switching time) of the H-bridge itself. Depending on the actual implementation, the bus capacitance $C_{BUS}$ can contribute to a (parasitic) resonance circuit, and—in a manner similar to that in the previous examples (LIN bus and CAN bus)—transient oscillations (ringing) can occur (see dashed line in FIG. 2C).

Now that some different bus driver circuits for different bus standards (LIN, CAN, FlexRay) have been described, some general aspects of these bus driver circuits will be summarized. A bus driver circuit has (at least) two circuit nodes. A first circuit node (cf. output node LIN in FIG. 1a, output node CANL in FIG. 1b and output node BP in FIG. 1c) is configured to be coupled to a bus line (e.g. a CAN bus line). The bus line causes a bus capacitance $C_{BUS}$ between the first and second circuit nodes (cf. the supply node SUP in FIG. 1a, the output node CANH in FIG. 1b and the output node BM in FIG. 1c). It should be noted that, although the bus capacitance $C_{BUS}$ is illustrated between the output node LIN and the ground node in FIG. 1a, an equivalent bus capacitance exists between the output node LIN and the supply node SUP.

The bus driver furthermore comprises a circuit having electronic switches (switching circuit), which is coupled to the first circuit node and configured to apply an output voltage $V_{BUS}$ between the first and second circuit nodes and thus to charge the bus capacitance $C_{BUS}$ if a control signal indicates a dominant state. Said control signal is designated as STX in FIG. 2a (LIN) and FIG. 2b (CAN) and as $S_{EN}$ in FIG. 2c (FlexRay). The output voltage is designated as $V_{BUS}$ in FIGS. 2b and 2c (CAN and FlexRay, respectively). In FIG. 1a (LIN), the output voltage between the first node (output node LIN) and the second node (supply node SUP) would be equal to $V_{DD}$-$V_{BUS}$. Furthermore, the bus drivers comprise a discharge circuit that includes at least one resistor $R_0$ (and optionally further circuit components). The discharge circuit is connected between the first and second circuit nodes and configured to enable the bus capacitance $C_{BUS}$ to be discharged via the resistor $R_0$ if the control signal indicates a recessive state. The discharge circuit (or parts thereof) can also serve as electrical termination (bus termination). In the present examples, the resistor $R_0$ can also be regarded as resistor for bus termination.

In other words: a bus driver has two circuit nodes, between which a defined output voltage is applied in a dominant state with the aid of electronic switches (e.g. transistors $T_1$, $T_2$), as a result of which the (parasitic) capacitance between the two circuit nodes is charged. In a recessive state, the capacitance mentioned can be discharged via the discharge circuit (e.g. the resistor $R_0$). As a further general observation it may be emphasized that the transition time from a dominant state to a recessive state is essentially concomitantly determined by the bus capacitance and the parameters of the discharge network and is not defined only by the characteristics of the electronic switches (and the driving thereof). The bus capacitance and also the output resistor $R_0$ are parameters which are given (e.g. by the length of the bus lines and the number of bus subscribers) and cannot simply be changed. The transition time from a dominant to a recessive state is thus dependent for example on parameters outside the bus driver circuit and, in the case of long bus lines, for example, the transition time to the recessive state can be comparatively long, and oscillations can occur.

Figure 3A:
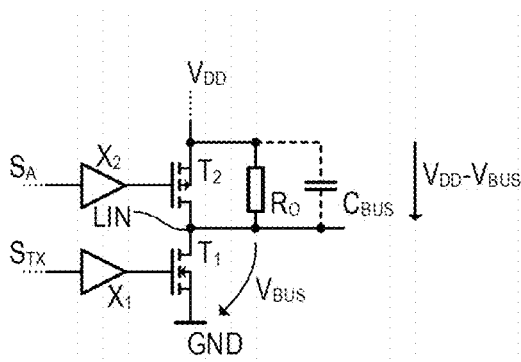
FIGS. 3a-3b show an example of an improved bus driver circuit (FIG. 3a) and associated signal profiles (FIG. 3b) for a LIN bus.

FIG. 3a contains an example of an improved bus driver circuit for use in a LIN bus node. The circuit is identical to the corresponding circuit from FIG. 1a, but it comprises an additional transistor $T_2$, the load current path (e.g. drain-source current path in the case of a MOSFET) of which is connected in parallel with the resistor $R_0$ (discharge network). As a result of switching on the low-side transistor $T_1$ (while the transistor $T_2$ is off), the output node LIN is actively pulled down to approximately the ground potential, and the voltage between the supply node SUP and the output node LIN is thus set to a voltage of approximately equal to the supply voltage $V_{DD}$. Since the voltage $V_{DD}$-$V_{BUS}$ is actively applied between the nodes SUP and LIN, this state is the dominant state. In order to change to the recessive state, the transistor $T_1$ is switched off, and the output voltage is thus no longer actively applied to the output node LIN. The charge stored in the bus capacitance $C_{BUS}$ can thus discharge via the resistor $R_0$. During this time period of discharging (transition time period), the transistor $T_2$ is temporarily driven such that it is (at least partly) conducting. The transistor $T_2$ thus temporarily provides a current path in parallel with the resistor $R_0$, which can significantly accel-erate the discharge process. The transistor $T_2$ can be regarded as a controllable resistor which can be varied continuously during the transition time period (from the dominant to the recessive state).

Figure 3B:
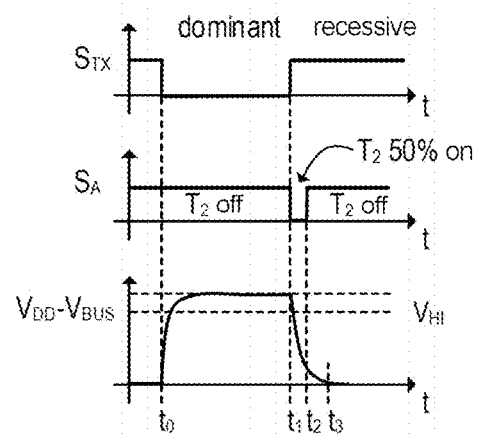

FIG. 3b contains timing diagrams of the output signal $V_{DD}$-$V_{BUS}$, of the associated binary control signal $S_{TX}$, according to which the transistor $T_1$ is driven by means of the gate driver $X_1$, and of the auxiliary control signal $S_A$, according to which the transistor $T_2$ is driven by means of the gate driver $X_2$. At the point in time $t_0$ the binary control signal $S_{TX}$ changes from a high level to a low level and thus indicates a transition to the dominant state. The gate driver $X_1$ generates a gate signal in order to switch on the transistor $T_1$, and the voltage $V_{DD}$ is thus applied between the supply node SUP and the output node LIN (i.e. voltage $V_{DD}$ is dropped across the resistor $R_0$). At the point in time $t_1$ the binary control signal $S_{TX}$ changes from a low level to a high level and thus indicates a transition to the recessive state. The gate driver $X_1$ thus generates a gate signal in order to switch off the transistor $T_1$, and the capacitance $C_{BUS}$ is discharged via the resistor $R_0$. At the same time $t_1$, the auxiliary control signal $S_A$ changes from a high level to a low level in order temporarily (by means of gate driver $X_2$) to activate the transistor $T_2$. Transistor $T_2$ temporarily provides an additional current path in parallel with the resistor $R_0$, via which additional current path the capacitance $C_{BUS}$ can be discharged. After a short time interval $t_2$-$t_1$ (i.e. at the point in time $t_2$) the signal $S_A$ changes back to a high level and the transistor $T_2$ is switched off again. The capacitance $C_{BUS}$ can continue to discharge via the resistor $R_0$ until a steady state is reached at the point in time $t_3$. The gate driver $X_2$ can be configured to control the transistor $T_2$ e.g. into a state of medium (i.e. partial) conductivity (i.e. a defined resistance) without fully switching on the transistor $T_2$. However, the additional current path temporarily (i.e. between the points in time $t_1$ and $t_2$) reduces the effective resistance and increases the current for discharging the bus capacitance $C_{BUS}$, which results in a significantly shorter transition time ($t_3$-$t_1$) from the dominant state to the recessive state. The time interval $t_2$-$t_1$ can be a fixed time period. Alternatively, switching off the transistor $T_2$ at the point in time $t_2$ can also be triggered by a receiver circuit present in the bus node (not illustrated in the figures, but present in the bus transceiver circuits), if a bus voltage level indicating the recessive state is detected.

Figure 4A:
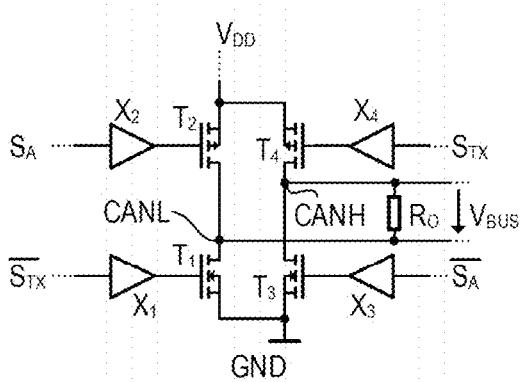
FIGS. 4a-4b show an example of an improved bus driver circuit (FIG. 4a) and associated signal profiles (FIG. 4b) for a CAN bus.
Figure 4B:
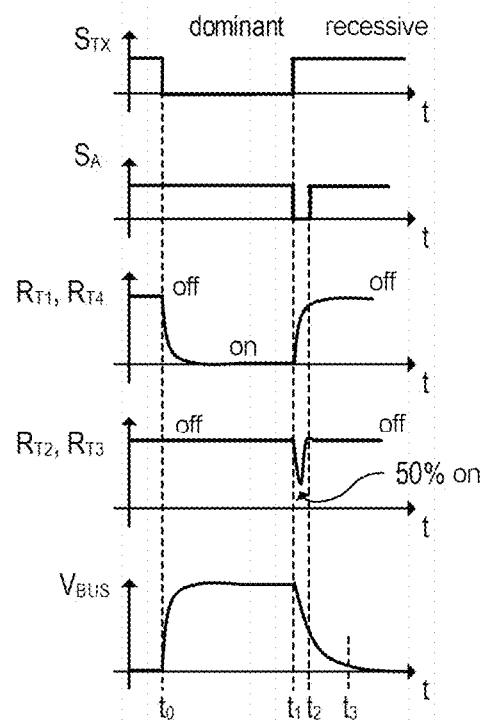

FIGS. 4a-4b show further examples of an improved bus driver for use in a CAN bus node. The circuit topology is the same as in FIG. 1c, but the driving of the transistors of the H-bridge is different in CAN operation. The H-bridge is constructed from two half-bridges, wherein each comprises a high-side transistor $T_2$ and $T_4$, respectively, and a low-side transistor $T_1$ and $T_3$, respectively. The center tap of the first half-bridge (T and $T_2$) forms the first output node CANL, and the center tap of the second half-bridge ($T_3$ and $T_4$) forms the second output node CANH. The bus voltage $V_{BUS}$ is the voltage between the nodes CANH and CANL. In the dominant state, the transistors $T_1$ and $T_4$ are switched on, wherein a voltage (approximately) equal to the supply voltage $V_{DD}$ is applied as bus voltage $V_{BUS}$ between the nodes CANH and CANL. In the recessive state, all the transistors $T_1$ to $T_4$ are switched off. Each of the transistors $T_1$ to $T_4$ is assigned a gate driver circuit $X_1$ to $X_4$ for generating suitable gate signals according to the control signal STX. The "main transistors" $T_1$ and $T_4$ are switched according to the binary control signal $S_{TX}$, whereas the "auxiliary transistors" $T_2$ and $T_3$ are controlled according to the auxiliary control signal $S_A$. The function and the operation of the bus driver circuit will now be explained with reference to the timing diagrams from FIG. 4b.

FIG. 4b includes exemplary timing diagrams illustrating the binary control signals $S_{TX}$ and $S_A$, the resulting resistances $R_{T1}$, $R_{T2}$, $R_{T3}$ and $R_{T4}$ of the four transistor load current paths and also the resulting differential output voltage $V_{BUS}$. At the point in time $t_0$ the binary control signal $S_{TX}$ changes from a high level to a low level and thus indicates a transition to the dominant state. Correspondingly, the gate drivers $X_1$ and $X_4$ generate gate signals in order to switch on the transistors $T_1$ and $T_4$, as a result of which the voltage $V_{DD}$ is applied between the output nodes CANH and CANL (i.e. the voltage $V_{DD}$ is dropped across the resistor $R_0$). During the dominant state, the transistors $T_1$ and $T_3$ are off. The resistance values $R_{T1}$ and $R_{T4}$ fall from a maximum (practically non-conducting off state) to a minimum (on state) while the bus voltage $V_{BUS}$ rises.

At the point in time $t_1$ the binary control signal $S_{TX}$ changes from a low level to a high level and thus indicates a transition to the recessive state. Correspondingly, the drivers $X_1$ and $X_4$ switch off the transistors $T_1$ and $T_4$, and the resistance values $R_{T1}$ and $R_{T4}$ rise again to the maximum resistance (off state). The capacitance $C_{BUS}$ can thus be discharged via the resistor $R_0$. At the same time $t_1$ the auxiliary control signal $S_A$ changes from a high level to a low level temporarily (by means of the gate drivers $X_2$ and $X_3$) to activate the transistors $T_1$ and $T_3$. The transistors $T_1$ and $T_3$ temporarily provide an additional current path, via which the capacitance $C_{BUS}$ can discharge. After a short time interval $t_2-t_1$ (i.e. at the point in time $t_2$) the signal $S_A$ changes back to a high level and the transistors $T_2$ and $T_3$ are switched off again. The capacitance $C_{BUS}$ can continue to discharge via the resistor $R_0$ until a steady state is reached at the point in time $t_3$. The gate drivers $X_2$ and $X_3$ can be configured to drive the associated transistors such that they assume a state of medium (i.e. partial) conductivity (i.e. a defined resistance) without fully switching on the transistors. The resistance values $R_{T2}$ and $R_{T3}$ of the transistors $T_2$ and $T_3$ over time are likewise illustrated in FIG. 4b.

The additional current path temporarily (i.e. between the points in time $t_1$ and $t_2$) reduces the effective resistance and increases the current for discharging the bus capacitance $C_{BUS}$, which results in a significantly shorter transition time ($t_3-t_1$) from the dominant state to the recessive state. The time interval $t_2-t_1$ can be a fixed time period. Alternatively, the switch-off point in time $t_2$ can also be detected by a receiver circuit (not shown in the figures but present in bus transceiver circuits) by virtue of a bus voltage level indicating the recessive state being detected.

For a FlexRay system, the bus driver has the same topology as for a CAN system (see FIG. 4a), but in a FlexRay system two different transitions are possible, namely from a dominant "0" state ($V_{BUS}=-V_{DD}$) to a recessive (idle) state and from a dominant "1" state ($V_{BUS}=+V_{DD}$) to the recessive state. The second case is the same as for the CAN example explained above. In the first case, the driver circuit operates analogously, with the transistor pairs $T_1$, $T_4$ and $T_2$, $T_3$ interchanging roles. The further description is limited to CAN systems, although the concepts described can be applied to other bus systems, such as LIN or Flexray, without any problems.

Figure 5A:
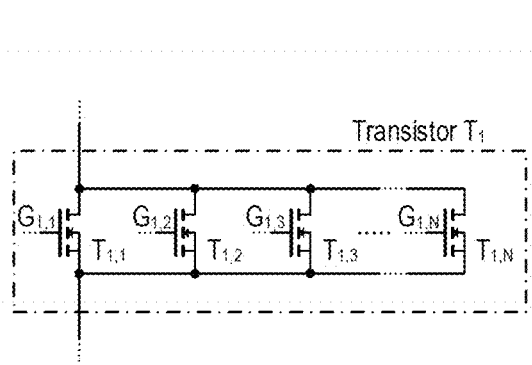
FIGS. 5a-5b show an example of an implementation of an electronic switch by a plurality of transistor cells connected in parallel (FIG. 5a), and the associated signal profiles (FIG. 5b) for driving the individual transistor cells.
Figure 5B:
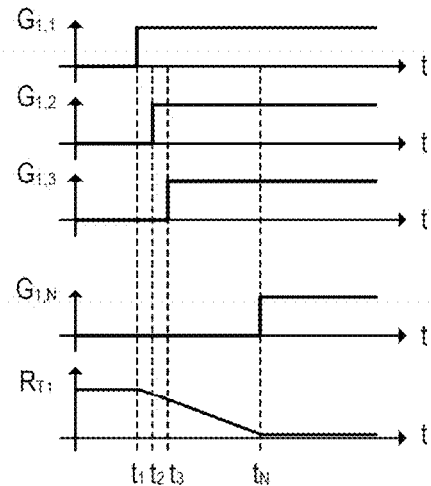

Transistors illustrated in the examples from FIGS. 1 to 4 can be constructed in each case from a multiplicity of transistor cells, wherein each transistor cell represents practically an elementary transistor. The individual transistor cells (i.e. the load current paths of the elementary transistors) are connected in parallel, and this parallel connection forms a transistor. In order to be able to control the switching behavior of the transistor upon switch-on and switch-off, it is possible, upon switch-on and switch-off, for the individual transistor cells to be switched on and off sequentially. "Soft" switching on and off with defined switching edges can be achieved in this way. This situation is illustrated in FIGS. 5a-5b. FIG. 5a illustrates by way of example the transistor $T_1$ as a parallel connection of N transistor cells $T_{1,1}$, $T_{1,2}$, $T_{1,3}$, ..., $T_{1,N}$. The control electrodes of the transistor cells $T_{1,1}$, $T_{1,2}$, $T_{1,3}$, ..., $T_{1,N}$ are driven with control signals $G_{1,1}$, $G_{1,2}$, $G_{1,3}$, ..., $G_{1,N}$ (e.g. gate voltage).

An example of a switch-on process with a defined switching edge is illustrated in FIG. 5b. In accordance with FIG. 5b, the individual transistor cells $T_{1,1}$, $T_{1,2}$, $T_{1,3}$, ..., $T_{1,N}$ are not driven simultaneously, but rather sequentially, in order to achieve a soft switch-on with a defined gradient of the switching edge. In the example illustrated, the transistor cell $T_{1,1}$ is switched on at the point in time $t_1$, the transistor cell $T_{1,2}$ is switched on at the point in time $t_2$, the transistor cell $T_{1,3}$ is switched on at the point in time $t_3$, etc. At the point in time $t_N$, the last transistor cell $T_{1,N}$ is activated and the transistor $T_1$ is fully switched on. The corresponding resistance $R_{T1}$ of the load current path of the transistor $T_1$ is likewise illustrated. Said resistance decreases from its maximum value (transistor $T_1$ switched off) beginning at the point in time $t_1$ (quasi-)continuously down to a very low resistance value $R_{T1,min}$ (transistor $T_1$ switched on). The switch-off can be achieved in a similar way by virtue of the transistor cells being switched off sequentially. The time-offset control signals $G_{1,1}$, $G_{1,2}$, $G_{1,3}$, ..., $G_{1,N}$ can be generated e.g. by a logic circuit contained in the gate driver circuit $X_1$. In FIG. 5b the time intervals $t_2-t_1$, $t_3-t_2$, etc. are identical (i.e. the points in time of switching of the individual transistor cells are temporally equidistant), although this need not necessarily be the case. The switching edge can theoretically be shaped in any desired manner by means of the points in time of switching being defined in a targeted manner. The edge shaping of the switching edges by individual transistor cells being switched on and off sequentially is known per se and will not be explained any further here.

Figure 6:
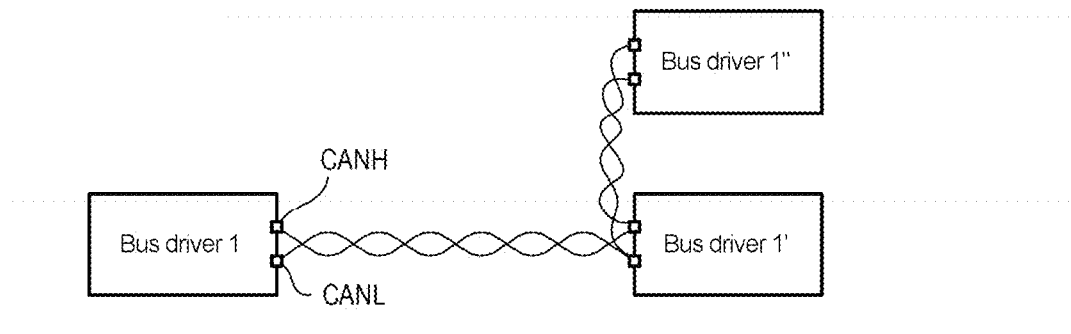
FIG. 6 shows an example of a bus system having a plurality of bus nodes.
Figure 7:
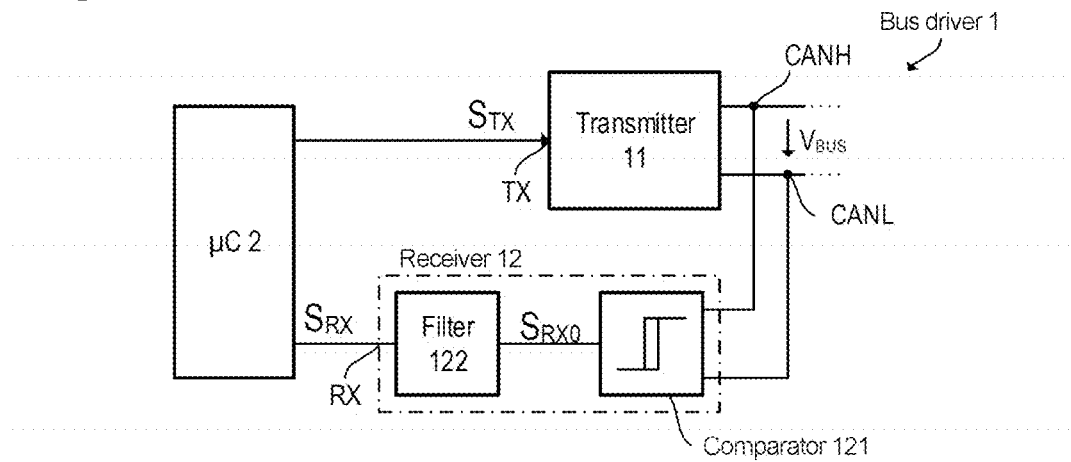
FIG. 7 shows an example of a simple implementation of a bus driver circuit comprising transmitter and receiver.

FIG. 6 shows a system comprising three bus nodes containing the bus drivers 1, 1' and 1''. The terminals CANH and CANL of the individual bus drivers 1, 1' and 1'' are connected e.g. via a twisted pair cable. In the examples illustrated in FIGS. 3a-3b and 4a-4b, only the transmitter circuits of the bus drivers are illustrated, whereas the associated receiver circuits have been omitted for the sake of clarity. FIG. 7 illustrates an example of a bus driver 1 comprising a transmitter circuit 11 and a receiver circuit 12. FIG. 7 also shows a controller 2 (e.g. a microcontroller or some other data source/sink), which is connected to the bus driver 1. The controller 2 can be configured to convert the data to be transmitted via the bus into a bit stream (signal $S_{TX}$, transmission signal) corresponding to the desired bus protocol. In the case of a CAN bus, the data transmission is carried out for example packet by packet in data frames. The transmitter circuit 11 contained in the bus driver 1 converts the bit stream contained in the transmission signal $S_{TX}$ into a corresponding bus signal $V_{BUS}$.

The receiver circuit contained in the bus driver 1 converts the voltage at the bus (e.g. the voltage between the nodes CANH and CANL in the case of a CAN bus) into a binary signal $S_{RX}$ (reception signal), which can be fed to the controller 2. The controller 2 can evaluate the bit stream contained in the reception signal $S_{RX}$ taking account of the bus protocol, for example can extract the received data from the received data frames. In the example illustrated in FIG. 7, the receiver 12 has a comparator 121 and a filter 122 connected downstream of the comparator 121. The comparator 121 receives the bus voltage $V_{BUS}$ and compares it with one or more threshold values that can be defined in the bus standard used. In the case of a CAN system, the comparator 121 can generate a (dominant) low level at its output (output signal $S_{RXo}$) if the bus voltage $V_{BUS}$ exceeds a first threshold value of 0.9 V, and can generate a (recessive) high level if the bus voltage $V_{BUS}$ falls below a second threshold value of 0.5 V. On account of the abovementioned oscillations and other disturbances it can happen that the logic level detected by the comparator is not stable. However, a 0 bit or a 1 bit is intended only to be detected if the bus voltage $V_{BUS}$ assumes a stable (dominant or recessive) state. In this context, stable means that the respective state lasts for a defined time duration (e.g. at least 1 µs) without interruption. Shorter state changes (spikes, transient pulses) are eliminated by the filter 122. In the example illustrated, the filter 122 receives the output signal $S_{RXo}$ of the comparator 121 and generates a corresponding signal $S_{RX}$ (reception signal), wherein the signal $S_{RX}$ indicates a bit value (1 or 0) only if, in the signal $S_{RXo}$, this value is stable for the defined time duration mentioned.

The receiver 12 receives bus signals (bus voltage $V_{BUS}$) not only from other bus drivers 1', 1", but also from the transmitter 11 of the same bus driver 1. If transmitter 11 and receiver 12 operate correctly, the received signal $S_{RX}$ corresponds to the transmitted signal $S_{TX}$, wherein the received signal $S_{RX}$ is delayed on account of the propagation time (in particular through the filter 122). The delay between the signals $S_{RX}$ and $S_{TX}$ is referred to as loop delay. The function of transmitter 11 and receiver 12 will be explained in greater detail with reference to the timing diagrams from FIG. 8.

Figure 8:
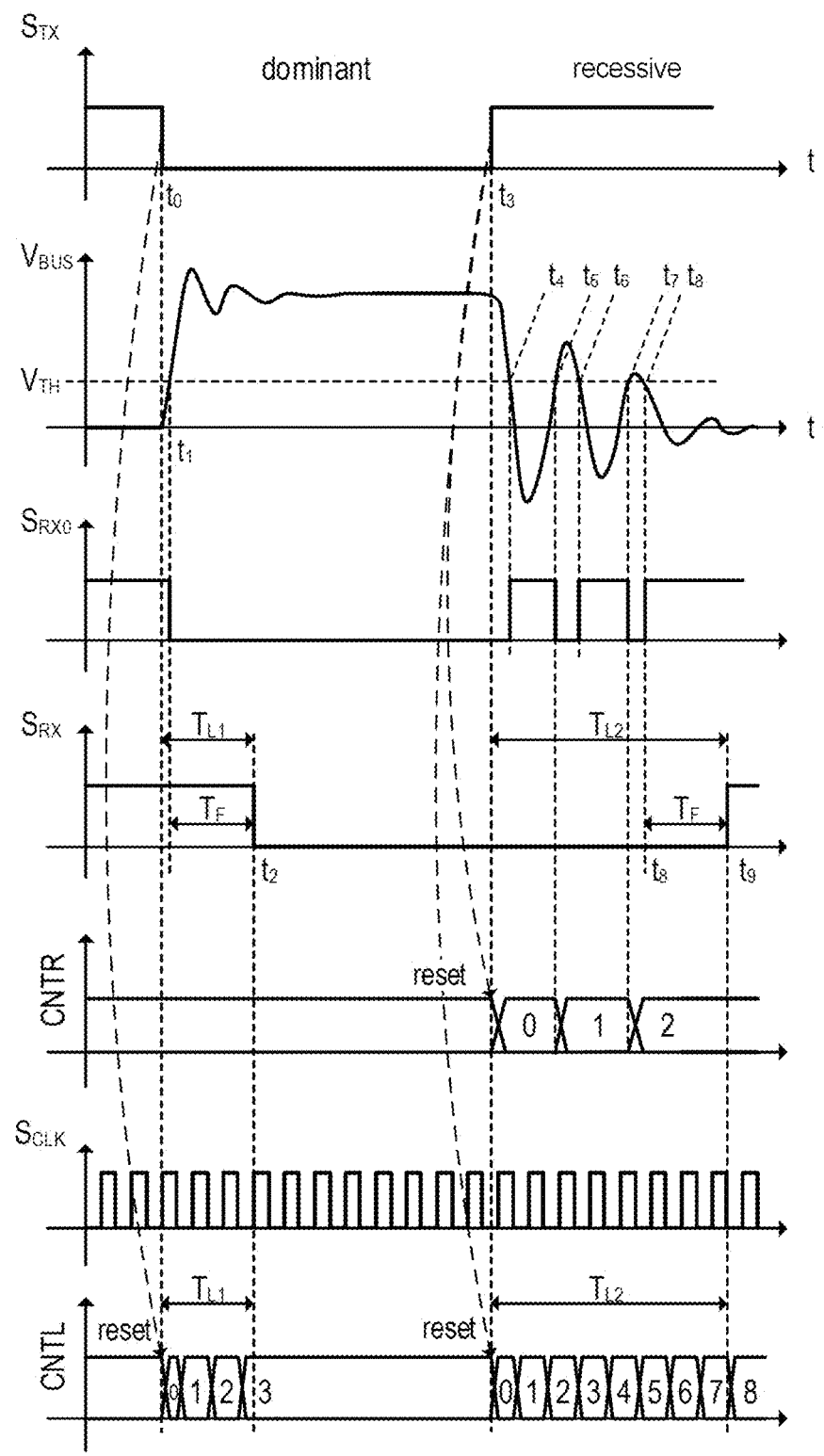
FIG. 8 includes a plurality of timing diagrams for elucidating the function of the bus driver circuit from FIG. 7.

FIG. 8 shows exemplary waveforms for the signals $S_{TX}$ (input signal of the transmitter 11), $V_{BUS}$ (output signal of the transmitter 11/input signal of the comparator 121), $S_{RXo}$ (output signal of the comparator 121) and $S_{RX}$ (output signal of the receiver 12, filtered). Furthermore, a clock signal $S_{CLK}$ is illustrated, which is processed in the filter 122, and also the counter values CNTR and CNTL, which represent the number of oscillations in the bus signal $V_{BUS}$ and the loop delay. In accordance with FIG. 8, the signal $S_{TX}$ changes from a recessive state (high level) to a dominant state (low level) at the point in time $t_0$ and changes back to the recessive state again at the point in time $t_3$. After the point in time $t_0$, the transmitter 11 of the bus driver 1 (see FIG. 7) drives its output transistors and the voltage $V_{BUS}$ rises, wherein a slight overshoot can occur. At the point in time $t_1$ the voltage $V_{BUS}$ exceeds the threshold value $V_{TH}$ of the comparator 121 of the receiver 12, and the comparator output signal $S_{RXo}$ changes from a high level to a low level. At the output of the filter 122, however, the level change does not appear until later after a filter time period $T_F$, i.e. at the point in time $t_2$ ($t_2=t_1+T_F$) once the state of the signal $S_{RXo}$ has been stable for the time period $T_F$. The time between the falling edge in the signal $S_{TX}$ (at the point in time $t_0$) and the corresponding falling edge in the signal $S_{RX}$ is referred to as loop delay $T_{L1}$ (loop delay upon the transition from the recessive to the dominant state).

At the point in time $t_3$ the voltage $V_{BUS}$ begins to fall and falls below the threshold value $V_{TH}$ at the point in time $t_4$, which brings about a rising edge in the comparator output signal $S_{RXo}$. As mentioned, upon a transition to the recessive state, oscillations can occur and the state detected by the comparator 121 changes rapidly according to the amplitude and the duration of the oscillations. In the example illustrated, the voltage $V_{BUS}$ crosses the threshold value a total of five times (at the points in time $t_4, t_5, t_6, t_7, t_8$) before a stable state of the signal $S_{RXo}$ is reached. It is only after the point in time $t_8$ that the voltage $V_{BUS}$ remains below the threshold value $V_{TH}$ and the comparator output signal $S_{RXo}$ remains stable at a high level for at least a time period $T_F$. After this time period $T_F$ has elapsed (i.e. at the point in time $t_8+T_F=t_9$), a high level indicating the recessive state also appears at the output of the receiver 12 (filter output signal $S_{RX}$). The time period $t_9-t_3$ between the rising edge in the signal $S_{TX}$ (at the point in time $t_3$) and the corresponding rising edge in the signal $S_{RX}$ is referred to as loop delay $T_{1,2}$ (loop delay upon transition from the dominant to the recessive state).

As mentioned, the filter 122 can eliminate/filter transient transitions in the comparator output signal $S_{RXo}$, wherein a transition appears at the filter output only if no further transition occurs at the filter input for a filter time $T_F$. That is to say that the transition at the point in time $t_4$ does not appear at the filter output because shortly afterward (at the point in time $t_5$) a further transition occurs ($t_5-t_4<T_F$), the transition at the point in time $t_5$ does not appear at the filter output because shortly afterward (at the point in time $t_6$) a further transition occurs ($t_6-t_5<T_F$), etc. The transition at the point in time $t_8$ appears at the filter output at the point in time $t_9=t_8+T_F$ because no further transition in the signal $S_{RXo}$ was detected at the filter input. In the filter 122 the filter time period $T_F$ can be implemented by means of a counter which is reset with each transition and which, in the case of a counter reading F (i.e. after F clock cycles of the clock signal $S_{CLK}$ without resetting) switches the input level through to the output of the filter. By means of further counters it is possible to ascertain the loop delays $T_{L1}$ and $T_{L2}$ (counter value CNTL) and also the number of filtered oscillations in the signal $S_{RXo}$ and/or $V_{BUS}$ (counter value CNTR).

Depending on the application, a loop delay that is as short as possible may be desirable or necessary (e.g. in the case of systems having high data rates such as e.g. CAN FD (Flexible Datarate) systems). A comparatively high loop delay can occur particularly in the case of transitions from a dominant to a recessive state. Since the recessive state is not actively constrained by the transmitter contained in the bus driver, but rather arises—as already described—on account of the discharge of the bus capacitance $C_{BUS}$ (cf. FIGS. 1a-1c), this transition tends towards oscillations and other disturbing effects that can lengthen the loop delay. The described inequality of the loop delays of the two transitions (dominant-recessive and recessive-dominant) can lead to a bit distortion that can lead to problems in sampling and frame recognition in the protocol handler (also called protocol engine). The timing diagrams contained in FIG. 9 illustrate two different effects upon transition to a recessive state which can lead to a comparatively long loop delay.

Figure 9:
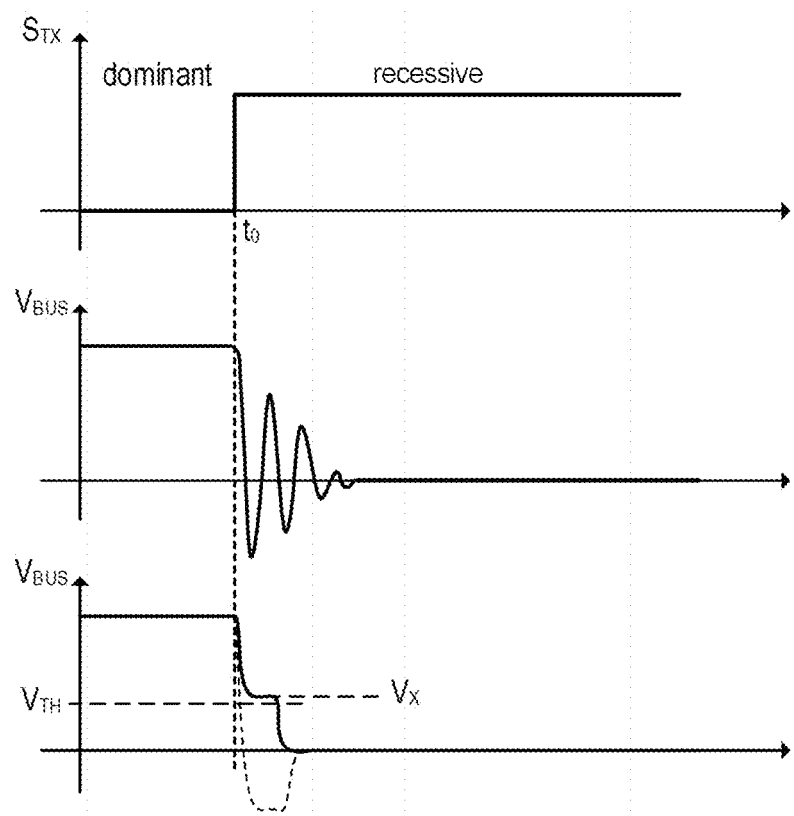
FIG. 9 includes timing diagrams for illustrating two effects (oscillations and reflections) which can adversely influence the loop delay of a bus driver.

The first timing diagram in FIG. 9 shows the transmission signal $S_{TX}$, which indicates a transition from the dominant to the recessive state at the point in time $t_0$. The second timing diagram in FIG. 9 shows the corresponding bus voltage $V_{BUS}$, wherein as in the previous example oscillations occur which increase the loop delay. The third timing diagram in FIG. 9 shows a different effect that can occur as an alternative to the oscillations mentioned. Accordingly, the voltage $V_{BUS}$ falls to zero in steps rather than directly. That is to say that for a certain time duration the voltage stays at a value $V_X$ (plateau), which can be greater than the threshold value $V_{TH}$ for the detection of the recessive state. This effect arises as a result of reflections at other bus nodes and can likewise lengthen the loop delay.

The undesired effects (oscillations and the step upon the transition to the recessive state) illustrated in FIG. 9 can be reduced by the bus voltage $V_{BUS}$—temporarily actively during a transition phase—being pulled to a low level. This procedure has already been explained with reference to FIGS. 3a-3b and 4a-4b. As a result of the temporary activation of one of more "auxiliary transistors" (cf. FIG. 4a, transistors $T_2$ and $T_3$), a low-impedance current path through the auxiliary transistors is provided in parallel with the output resistor $R_0$, which accelerates the discharge of the bus capacitance $C_{BUS}$, damps oscillations and reduces the "step height" of the reflections (see voltage $V_X$ in FIG. 9) below the threshold value $V_{TH}$.

Figure 10:
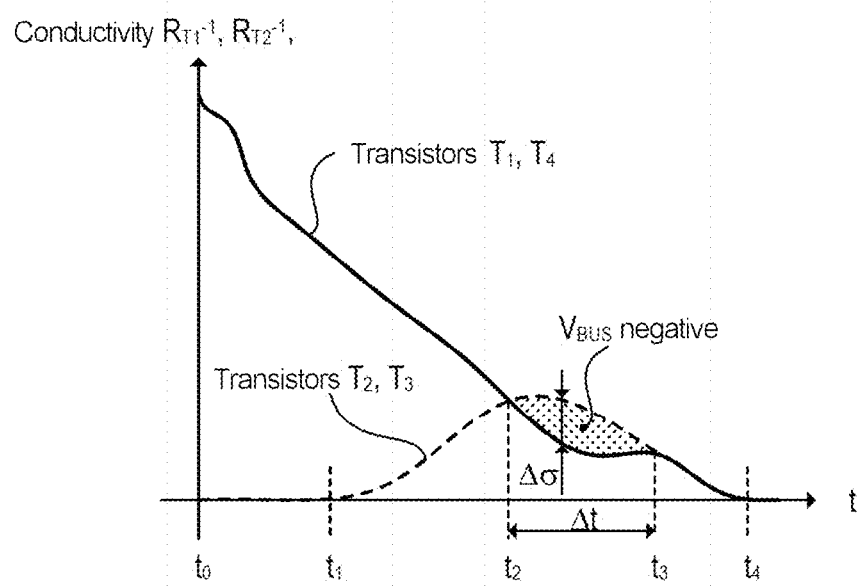
FIG. 10 is a diagram for elucidating a transition from a dominant to a recessive state in the case of a driver circuit in accordance with FIGS. 4a-4b.

The diagram from FIG. 10 illustrates a switching process during the switchover to a recessive state for a transistor H-bridge in accordance with FIG. 4a. The ordinate represents the conductivity (reciprocal resistance) of the load current paths of the transistors $T_1$ to $T_4$. The abscissa is the time axis. In the event of transition to the recessive state, the (main) transistors $T_1$ and $T_4$ (see FIG. 4a) are switched off with a defined switching edge. The conductivities $1/R_{T1}$ and $1/R_{T4}$ decrease—beginning at the point in time $t_0$—continuously down to approximately zero (point in time $t_4$). The switching edge can be shaped e.g. by sequentially driving the individual transistor cells (cf. FIGS. 5a-5b). During this transition time period ($t_0$ to $t_4$), e.g. at the point in time $t_1$ the (auxiliary) transistors $T_2$ and $T_3$ are temporarily activated and their conductivities $1/R_{T2}$ and $1/R_{T3}$ rise to a maximum value and then fall again to approximately zero until the point in time $t_4$. As illustrated in FIG. 10, in the time interval $\Delta t$ from the point in time $t_2$ until the point in time $t_3$, the conductivity of the transistors $T_2$ and $T_3$ is higher than the conductivity of the transistors $T_1$ and $T_4$ (difference approximately $\Delta\sigma$), which can result in a negative output voltage $V_{BUS}$ of the transistor H-bridge (see dashed line in the third diagram in FIG. 9).

The dotted region illustrated in FIG. 10 is the region in which the conductivity of the main transistors is lower than that of the auxiliary transistors. Parameters such as the size (in relation to $\Delta t$ and $\Delta\sigma$) and the temporal position of said region influence the signal profile (e.g. number and amplitude of the oscillations) of the actual bus voltage $V_{BUS}$ upon the transition to the recessive state and thus also the loop delay. In order to generate a specific bus voltage $V_{BUS}$ sought, it is possible to use many different combinations of operating points of the transistors $T_1$ to $T_4$ (cf. FIG. 4a) which differ in each case in terms of the output impedance of the H-bridge (bridge impedance). Here in the case of a low bridge impedance in the current paths supply ($V_{CC}$)–$T_2$-$T_1$ ground (GND) and supply ($V_{CC}$)–$T_4$-$T_3$ ground (GND), a shunt current that results is higher than that in the case of a high bridge impedance. It is evident that the damping of oscillations (cf. FIG. 9, middle diagram) in the network is accomplished all the better, the lower the bridge impedance.

Figure 11:
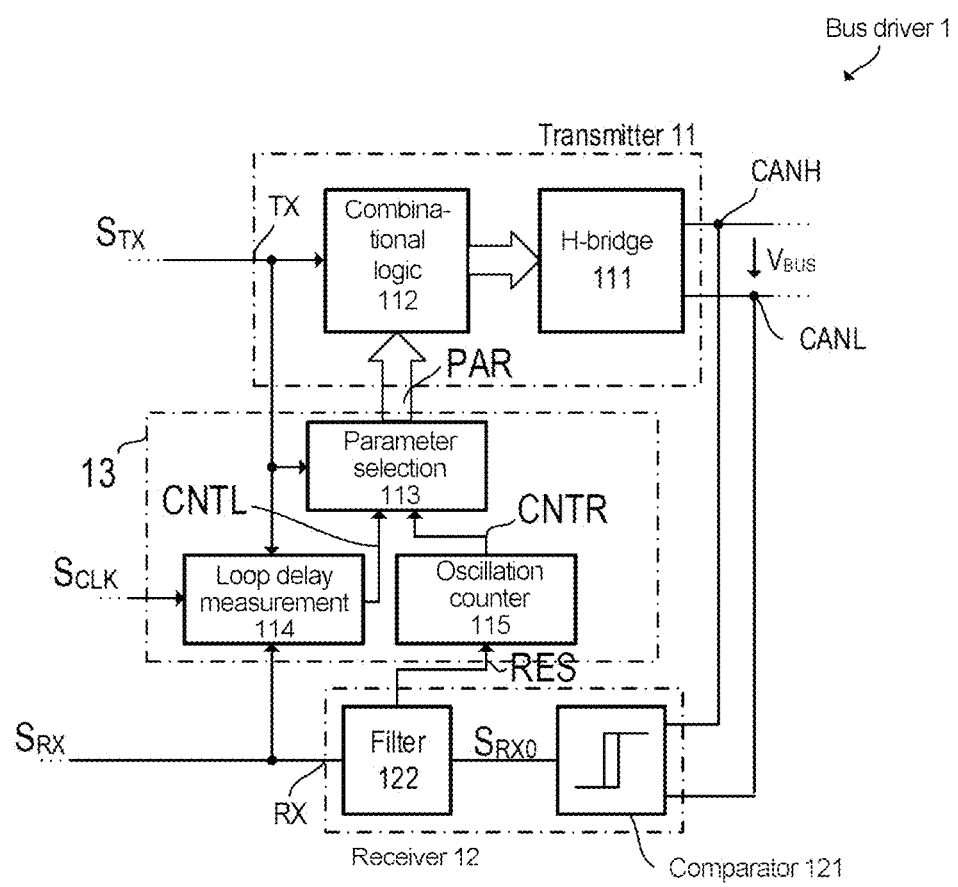
FIG. 11 shows an exemplary embodiment of an improved bus driver.

FIG. 11 shows a further example of a bus driver circuit, which is substantially an extension of the circuit from FIG. 7. The bus driver in accordance with FIG. 11 comprises a transmitter 11 and a receiver 12. The transmitter 11 receives the (binary) signal $S_{TX}$ to be transmitted via the bus and is configured to generate a corresponding voltage signal $V_{BUS}$ at the bus, which is provided between the nodes CANH and CANL in the case of CAN bus. The transmitter 11 comprises a combinational logic 112 and an output stage 111 connected downstream of the combinational logic 112, which output stage can comprise e.g. a transistor half-bridge, a transistor H-bridge, or some other switching circuit having a plurality of electronic switches. In the illustrated example of a CAN driver circuit, a transistor H-bridge can be used, wherein each transistor of the H-bridge can be constructed from a plurality of transistor cells. A sequential logic can also be provided instead of the combinational logic 112. The combinational logic 112 receives the signal $S_{TX}$ and is configured, depending thereon, to generate the control signals for the individual transistor cells (cf. FIGS. 5a-5b). As mentioned, the shape of the edges upon switch-on and switch-off can be influenced by sequentially driving the transistor cells.

The receiver 12 is constructed in a manner substantially identical to that in the example from FIG. 7, and reference is made to the description above. The driver circuit in accordance with FIG. 11 furthermore comprises a measuring circuit 114 configured to measure the loop delay (cf. FIG. 8, loop delays $T_{L1}$ and $T_L$). In the example illustrated, the measuring circuit 114 comprises a counter that counts the clock cycles of a clock signal $S_{CLK}$ (having a clock frequency $f_{CLK}$) between an edge in the signal $S_{TX}$ and a corresponding edge in the signal $S_{RX}$. The loop delay is then proportional to the counter reading CNTL and is equal to CNTL·$f_{CLK}^{-1}$.

Furthermore, the driver circuit can comprise a counter circuit 115 configured to count the oscillations masked out by the filter 122 in the receiver. As already explained with regard to FIG. 8 the filter 122 can mask out short pulses (shorter than a filter time $T_F$) in the comparator output signal $S_{RXo}$. By way of example, the filter 122 can internally have a counter that is reset with each (rising or falling) edge in the signal $S_{RXo}$. If the counter overflows without resetting after a time $T_F$, the level of the signal $S_{RXo}$ is output at the filter output. The counter 115 can count the number of resets and thus the number of oscillations. The counter readings CNTL and CNTR are fed to a parameter selection unit 113 configured to select a parameter set PAR (having one or more parameters) for the combinational logic 112 depending on the counter values CNTL and CNTR. The parameter selection unit 113, the measuring circuit 114 and the counter circuit 115 are designated jointly as control circuit 13.

The parameter set PAR can be used e.g. by the combinational logic 112 for generating the drive signals for the H-bridge 111. The parameter set PAR can thus be regarded as a vector of control parameters, and the present parameter set PAR determines the switching behavior of the transistors of the H-bridge in the transition phase from a conducting to a non-conducting state and vice versa (see FIG. 10). In the example illustrated in FIG. 10, the shape of the conductivity curves and thus also the size ($\Delta\sigma$ and $\Delta t$) and the temporal position of the dotted region were determined by the parameter set PAR. As already explained, the size ($\Delta\sigma$ and $\Delta t$) and the temporal position of said region determine the duration and the absolute value of the negative open-circuit bridge output voltage, which in turn influences the loop delay and the oscillations.

By altering the parameter set PAR, it is possible to adapt the generation of the control signals (gate signals) for the transistor cells of the transistors of the H-bridge such that the loop delay is reduced. With a comparatively complex parameter selection unit 113, the parameter set PAR can be varied such that the loop delay is minimized (optimized). However, an optimization can necessitate a very complex parameter selection unit 113 and a likewise complex combinational logic 112. In simpler approaches, that parameter set PAR which results in the smallest loop delay can be selected e.g. from a predefined number of predefined parameter sets. This selection can be carried out e.g. by means of try and error.

The function of the bus driver illustrated in FIG. 11 and the method implemented by the bus driver are summarized hereinafter with reference to the flow diagram from FIG. 12. The bus driver firstly receives a signal (transmission signal $S_{TX}$) to be transmitted via the bus, for example from a microcontroller (cf. FIG. 7, μC 2), and converts (see FIG. 12, step S1) said transmission signal $S_{TX}$ into a corresponding bus signal $V_{BUS}$ (e.g. differential voltage between nodes CANH and CANL in the case of CAN systems) by driving an output stage of a transmitter having a plurality of switches. The output stage can comprise a transistor half-bridge or a transistor H-bridge (e.g. in the case of CAN or Flexray systems) (see e.g. FIGS. 4a-4b), and driving the output stage is carried out depending on a parameter set PAR that influences the switching behavior of the switches of the output stage. The bus signal $V_{BUS}$ can be transmitted via the bus and received by a different bus node. However, the bus signal $V_{BUS}$ is also processed in the receiver of the bus driver in which the transmitter is also situated, and the bus signal $V_{BUS}$ is converted into a corresponding reception signal $S_{RX}$ by the receiver circuit (see FIG. 12, step S2). In this case, the reception signal $S_{RX}$ substantially corresponds to the transmission signal $S_{TX}$. However, transitions (edges) in the reception signal $S_{RX}$ are delayed by a loop delay $T_{L1}$ or $T_{L2}$ relative to corresponding transitions (edges) in the transmission signal $S_{TX}$.

Figure 12:
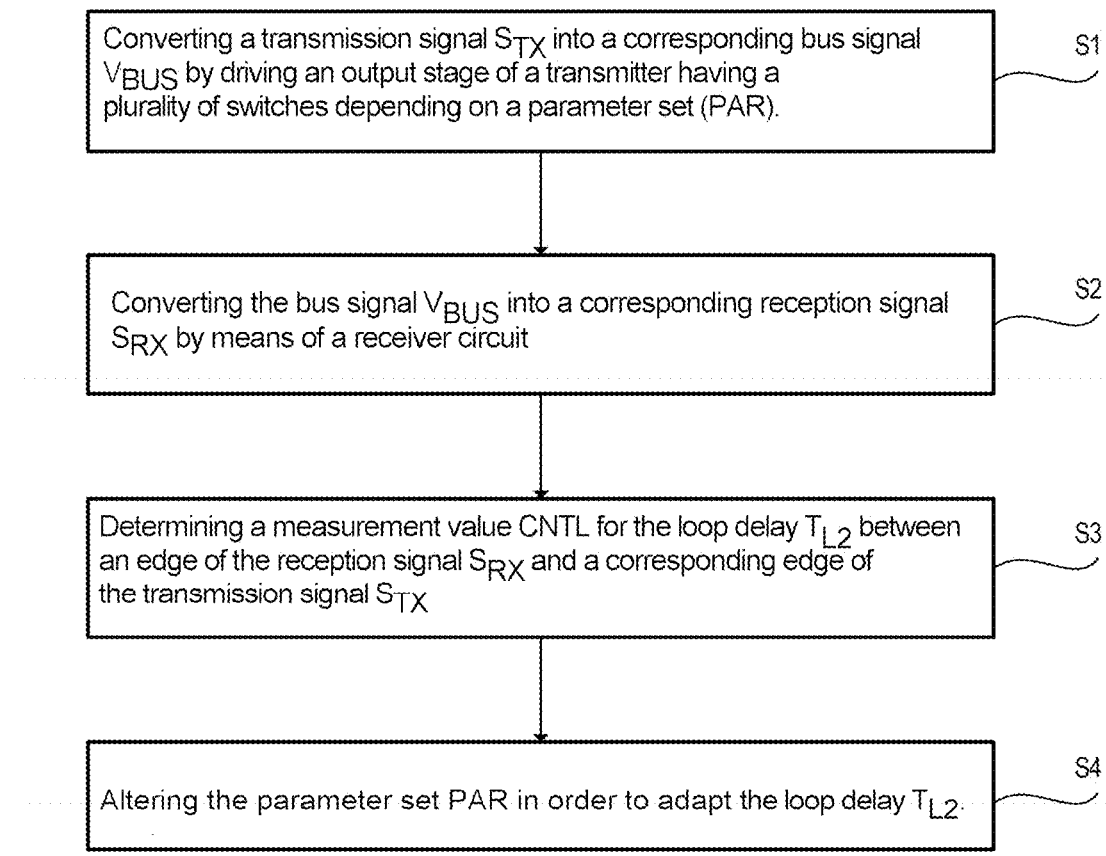
FIG. 12 is a flow diagram for illustrating an example of a method for a bus driver.

In accordance with the example illustrated in FIG. 12, said loop delay $T_{L1}$ or $T_{L2}$ is measured (see FIG. 12, step S3). This can be done using e.g. a clocked counter circuit (see FIG. 11, loop delay measuring circuit 114), wherein the counter reading represents the present loop delay. Finally, the parameter set PAR that influences the driving of the output stage in the transmitter can be altered (see FIG. 12, step S4), which can result in an alteration of the loop delay. The steps illustrated in FIG. 12 can be repeated until a parameter set PAR has been found (e.g. from a predefined set of parameter sets) for which the resulting loop delay is minimal.

The variation of the parameter set PAR can be carried out in various ways. By way of example, from a predefined set of parameter sets it is possible to "try out" different parameter sets in order to ascertain for which parameter set the resulting loop delay is the smallest. However, it is also possible to use more complex algorithms in order to minimize the loop delay. Various optimization methods are known per se (e.g. gradient method, steepest descent method, etc.) and are therefore not explained in any greater detail here. Very generally, the "feedback" of the measured loop delay makes it possible to adapt the parameter set PAR for the transmitter and thus makes it possible to flexibly adapt the bus driver to the bus (length/capacitance of the lines, number of bus nodes, etc.).

The optimization/minimization of the loop delay (under predefined constraints) can be suitable for reducing the undesired effects illustrated in FIG. 9 (middle and bottom timing diagrams). In addition or as an alternative to the loop delay, it is possible to evaluate the number of oscillations (cf. FIG. 8, signal CNTR). By varying/optimizing the parameter set PAR, an attempt can be made to reduce the number of oscillations. In one example, the loop delay is measured directly (counter value CNTL, cf. FIG. 11, loop delay measurement 114), wherein the measured number of oscillations (counter reading CNTR) can be taken into account when altering/optimizing the parameter set PAR. In a modified exemplary embodiment, the optimization of the parameter set PAR can be geared to minimizing (under predefined constraints) a combined coefficient of measure influenced by loop delay and number of oscillations. Said combined coefficient of measure could be e.g. a weighted sum or a weighted average of the values CNTL and CNTR. In accordance with another example, both approaches can be tested (minimizing the loop delay and minimizing the oscillations), and then that "optimum" parameter set PAR which leads to the better results can be used. This takes account of the fact that, in the case of oscillations, parameter values that yield an optimum may be different than those in the case of the "plateau effects" (cf. FIG. 9, bottom diagram).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   receiving a transmission signal;
   converting the received transmission signal into a corresponding bus signal by driving an output stage of a transmitter having a plurality of switches, wherein a switching behavior of the plurality of switches of the output stage is dependent on a parameter set;
   converting the bus signal into a corresponding reception signal, wherein an edge of the reception signal is delayed by a loop delay relative to a corresponding edge in the transmission signal;
   determining a measurement value for the loop delay; and
   altering the parameter set in order to adapt the loop delay.

2. The method as claimed in claim 1, wherein the parameter set is altered depending on the measurement value for the loop delay.

3. The method as claimed in claim 1, wherein altering the parameter set comprises selecting the parameter set from a set of parameter sets and the parameter set is replaced by a selected parameter set.

4. The method as claimed in claim 3,
   wherein all parameter sets are selected in turn from the set of parameter sets and an associated measurement value for the loop delay is ascertained for each parameter set, and
   the method further comprises subsequently using the parameter set for which the measurement value for the loop delay is the lowest.

5. The method as claimed in claim 1, wherein the loop delay is measured digitally using a clocked counter circuit, wherein a counter reading of the clocked counter circuit is the measurement value for the loop delay.

6. The method as claimed in claim 5, further comprising determining a number of oscillations in the bus signal which are greater than a threshold value, and altering the parameter set is based on the determined number of oscillations.

7. The method as claimed in claim 1, further comprising determining a number of oscillations in the bus signal which are greater than a threshold value, and the measurement value for the loop delay is based on the determined number of oscillations.

8. The method as claimed in claim 1, wherein converting the bus signal into the corresponding reception signal comprises:
   generating a logic signal indicating whether the bus signal has undershot a threshold value;
   filtering the logic signal; and
   providing the filtered signal as reception signal.

9. The method as claimed in claim 1, wherein the switching behavior of the plurality of switches is based on a temporal profile of conductivities of the plurality of switches, and the temporal profile of the conductivities of the plurality of switches is based on the parameter set.

10. The method as claimed in claim 1, wherein the output stage comprises an output impedance whose temporal profile during a switching is dependent on the parameter set.

11. The method as claimed in claim 10, wherein a time duration and an absolute value of a negative bus voltage are influenced by the temporal profile of the output impedance during when a switch of the plurality of switches is switched-off.

12. The method as claimed in claim 1, wherein each switch of the plurality switches of the output stage comprise a multiplicity of transistor cells, and wherein driving the output stage of the transmitter comprises generating control signals for individual transistor cells of the multiplicity of transistor cells based on the transmission signal and depending on the parameter set, wherein a temporal profile of a switching process of the individual transistor cells of the multiplicity of transistor cells is based on the parameter set.

13. The method as claimed in claim 12, wherein the temporal profile of the switching process of the individual transistor cells of the multiplicity of transistor cells depends on a temporal sequence of the switching process of the individual transistor cells of a respective switch and said temporal sequence is determined by the parameter set.

14. A bus driver comprising:

at least one first circuit node configured to be connected to at least one bus line;

a transmitter comprising an output stage having a plurality of switches, wherein the transmitter is configured to receive a transmission signal, to convert the received transmission signal into a corresponding bus signal by driving the output stage, and to output the bus signal at the at least one first circuit node, wherein driving the output stage is performed based on a parameter set that influences switching behavior of the plurality of switches of the output stage;

a receiver configured to convert the bus signal into a reception signal, wherein an edge in the reception signal is delayed by a loop delay relative to a corresponding edge in the transmission signal; and a control circuit coupled to the transmitter and the receiver, the control circuit configured to determine a measurement value for the loop delay and to alter the parameter set in order to adapt the loop delay.

15. The bus driver as claimed in claim 14, wherein the control circuit comprises a measuring circuit configured to measure the loop delay by means of a clocked counter.

16. The bus driver as claimed in claim 14, wherein the control circuit comprises a counter circuit configured to count a number of oscillations in the bus signal which are greater than a threshold value.

17. The bus driver as claimed in claim 14, wherein the control circuit comprises a parameter selection unit configured to adapt the parameter set on the basis of the measurement value for the loop delay.

* * * * *